United States Patent
Mora et al.

(10) Patent No.: US 6,880,100 B2
(45) Date of Patent: Apr. 12, 2005

(54) PEER-TO-PEER FAULT DETECTION

(75) Inventors: Oscar Mora, Caracas (VE); Roger Pinate, Caracas (VE); Roberto Ponticelli, Caracas (VE)

(73) Assignee: Smartmatic Corp., Boca Raton ( * ) Notice: Subject to any disclaimer, the term of this patent is extended or adjusted under 35 U.S.C. 154(b) by 388 days.

(21) Appl. No.: 09/682,089

(22) Filed: Jul. 18, 2001

(65) Prior Publication Data

US 2003/0018930 A1 Jan. 23, 2003

(51) Int. Cl.[7] ............................................. G06F 11/00
(52) U.S. Cl. .......................... 714/4; 714/43; 714/11; 709/224
(58) Field of Search ............................ 714/42, 4, 43, 714/11; 709/222, 224, 220; 713/1

(56) References Cited

U.S. PATENT DOCUMENTS

| | | | | |
|---|---|---|---|---|
| 5,167,035 A | * | 11/1992 | Mann et al. ................. | 714/4 |
| 5,452,419 A | * | 9/1995 | Di Giulio et al. ........... | 709/200 |
| 5,696,895 A | * | 12/1997 | Hemphill et al. ............. | 714/4 |
| 5,884,018 A | * | 3/1999 | Jardine et al. ................ | 714/4 |
| 5,925,137 A | * | 7/1999 | Okanoue et al. .............. | 714/4 |
| 5,926,619 A | * | 7/1999 | Badovinatz et al. .......... | 714/4 |
| 6,192,483 B1 | * | 2/2001 | Moiin et al. .................. | 714/4 |
| 6,442,713 B1 | * | 8/2002 | Block et al. .................. | 714/43 |
| 6,449,641 B1 | * | 9/2002 | Moiin et al. ................. | 709/220 |
| 6,487,678 B1 | * | 11/2002 | Briskey et al. ............... | 714/4 |
| 2002/0145983 A1 | * | 10/2002 | Block et al. ................. | 370/254 |

* cited by examiner

*Primary Examiner*—Robert Beausoliel
*Assistant Examiner*—Yolanda L Wilson
(74) *Attorney, Agent, or Firm*—Jeffrey Furr, Esq.

(57) ABSTRACT

This inventions discloses a fault or abnormal status detection mechanism applied to distributed networks considering a shared media. A set of programmed routines executing in every node connected to a distributed network establish pairs of inter-monitoring nodes. At system power up, every node searches for another free, unpaired node using random timeout messaging generation to prevent collisions of network messages. After all pairs have been formed, a periodic check message is sent from one node to its associated partner (and vice versa) requesting its operating status. A response, containing a node's status, is generated upon receipt of a check message. If an abnormal status is received, or there is no response, a report is sent to a monitoring station or stored as a failure network event. The timeout period, in the order of seconds, between each check message is adjusted according to the number of connected nodes and available network bandwidth. This prevents excessive traffic generation that could affect performance. A longer timeout period, in the order of minutes, indicates when to restart the pair assignation process again, periodically changing all established pairs.

2 Claims, 2 Drawing Sheets

PEER-TO-PEER FAULT DETECTION

BACKGROUND OF INVENTION

1. Field of Invention

This invention relates to fault detection in a distributed network, and more specifically, to a mechanism for peer-to-peer fault detection.

2. Discussion of Prior Art

In modern systems, a distributed network is defined as a group of systems or nodes, of equal processing capabilities, that can intercommunicate in a networking manner. Each system has its own tasks and processes. Nonetheless, a particular task may require resources available in remote systems, involving the use of a networking environment.

Two clear examples of a distributed network are local area networks (LANs) and distributed control networks. A LAN comprises a group of personal computers, generally controlled by users, that intercommunicate through shared physical media to transfer information among them. In a distributed control network, several similar controllers are programmed to execute a control strategy or algorithm to control a specific process. A complex process is divided into simpler processes suitable for simple control devices, and each controller is responsible for a fraction of the control strategy. The control network coordinates the whole control strategy, since actions performed by a given controller may affect actions performed by a remote controller present in the same control network.

In these examples, close relationships are usually established between nodes, and any node may depend on one or more nodes. For example, a local area network may enclose a personal computer responsible for storing information in the form of a database accessible from remote computers. A distributed control network may include a controller responsible for checking the on/off state of an element of the controlled process and for the propagation of said information to other controllers in the network. In both examples, failure of the provider node (i.e., database server and sensing controller) affects all other nodes that depend on it.

Finding and fixing an inoperative node is a time consuming task. In many cases, the entire system must be stopped to replace or fix the defective node. There is the need for a mechanism to minimize these situations.

Corrective and/or preventive measures can be taken to keep the network in operation. Corrective measures are usually implemented as redundancy. A redundant system involves the use of duplicate equipment (e.g., primary and secondary equipment), such as duplicate physical network lines, power supplies, I/O peripherals, etc. The primary equipment is always in use. In case the primary equipment fails, secondary equipment may become active, and an alarm be sent to the user or operator indicating failure of primary equipment. By this mechanism, defective devices can be replaced without stopping the system.

Although redundancy solves the problem, it involves high equipment costs (due to duplication), despite its infrequent use.

A preventive mechanism proposes a periodical monitoring of every node present in the network to keep track of the status of each node. Then, a failure may be anticipated and a priori fault-correction actions taken with little or no impact due to network failure. The majority of network failures may be avoided by adding special monitoring devices or special diagnosis tests on each node. Compared to redundant measures, this preventive approach represents a cost-effective solution. The preventive approach is the subject of the present invention.

In the recent past, there have been many attempts to solve the monitoring and status report problem. A proposed solution is the addition of special network devices that may ask all or a group of network nodes for their status. Any irregular status or the absence of a response by a node is reported to the user or to another station or system capable of handling such situation. Yet, adding specialized devices embodies a situation similar to the above physical redundancy solution, i.e., Increasing the costs for establishing a reliable network. Furthermore, the failure of the specialized monitoring device represents the failure of the monitoring mechanism itself, since the fault and status detection functions are centralized in such devices.

Rather than using centralized monitoring devices, the fault detection functions may be integrated into the network nodes themselves, thus eliminating the existence of external monitoring devices. Every node may have the capability of checking the operation of all other nodes present in the network, maintaining a dynamic table of existing nodes. In a computer network, for example, this mechanism can be easily supported. However, controllers used in a control network do not always possess enough memory to store a dynamic table. This problem arises as soon as the number of nodes increases, since the size of the dynamic table must be increased too. Furthermore, the computation time needed to check the status of all other nodes increases proportionally with an increase in the number of nodes.

This invention proposes a cost-efficient fault and status detection method suitable for different types of networks, involving low computation time and memory requirements, regardless of the number of nodes in the network.

SUMMARY OF INVENTION

This invention discloses a method for peer-to-peer fault detection suitable for distributed, shared media networks.

In a distributed network comprising a group of nodes, all of them with equal characteristics and sharing a common communication network supporting point-to-point and broadcast messaging, peer-to-peer logic fault detection is implemented in the form of software routines in which, at network power up, each node finds a pair to establish a peer-to-peer checking mechanism.

Using random or pseudo-random timeout generation along with broadcast messaging, pairs of nodes are gathered until every node has an associated pair (the case of an odd number of nodes is also considered). Depending on network bandwidth and number of formed pairs, a node is assigned a timeout period to periodically send an assessment message to its associated partner node. The partner node must generate and send a status report back to the first node. An irregular status or non-received response is reported to the monitoring station or is stored as a network event for further report when needed.

After certain amount of time, in the order of hours, any node may send a broadcast restart message to request reestablishment of network peer-to-peer pairs.

OBJECTS AND ADVANTAGES

Accordingly, several objects and advantages of the present invention are: a) To provide a low-cost fault detection mechanism suitable for distributed networks; b) To provide a simple low computation and low memory consumption fault detection mechanism suitable for both high- and low-processing power systems (nodes) in a distributed network; c) To provide a fault detection mechanism in accordance to the number of existent nodes and available bandwidth; d) To provide a mechanism where memory and computation time may be independent from the number of applicable network nodes.

Other objects and advantages of this invention will become apparent from a consideration of the ensuing description and drawings.

Figure 1:
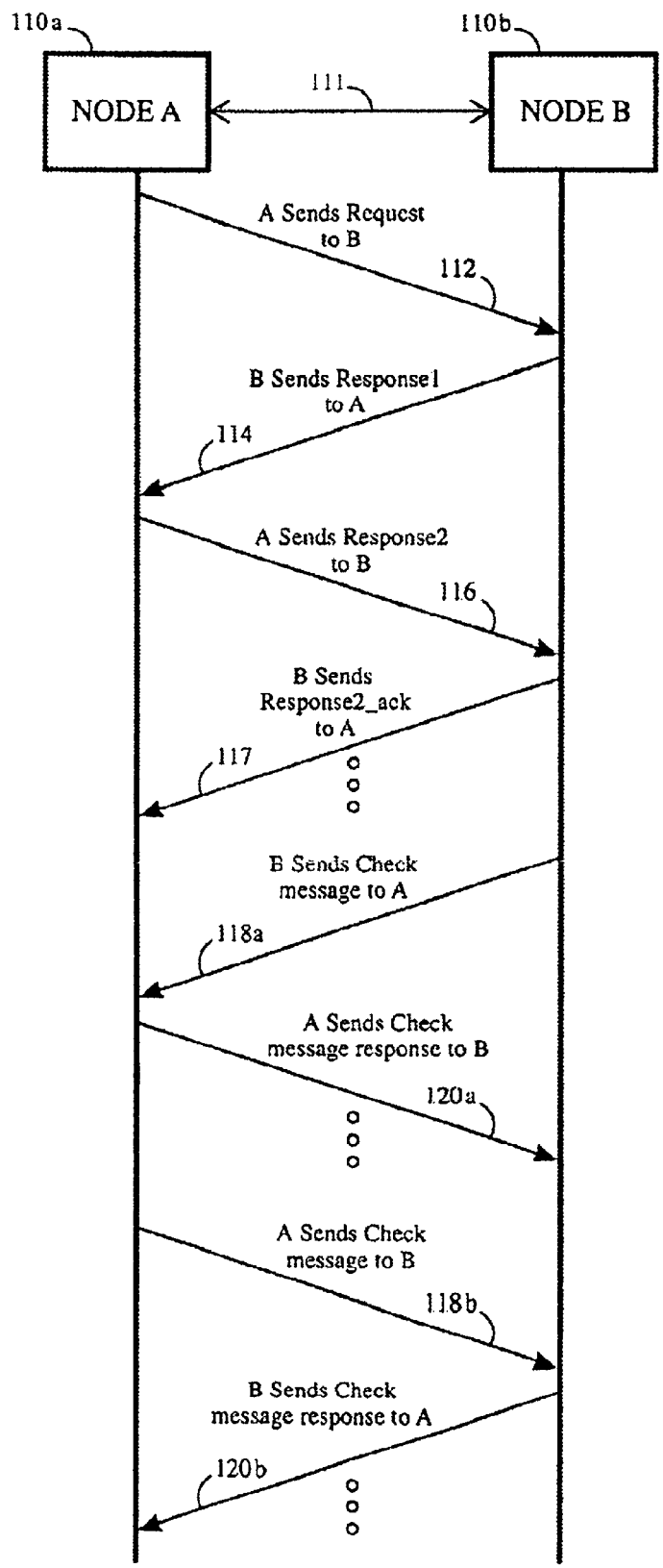
FIG. 1 shows a full handshake mechanism applied to this invention.

LIST OF REFERENCE NUMERALS IN DRAWINGS 110a, 10b Generic nodes connected through a network 111 Distributed, shared media network 112 Sending process of a Request message from node A to node B 114 Sending process of a Response1 message from node B to node A 116 Sending process of a Response2 message from node A to node B Sending process of a Response back message from node B to node A 118a Sending process of a Check message from node B to node A 118b Sending process of a Check message from node A to node B 120a Sending process of a Check message response from node B to node A 120b Sending process of a Check message response from node A to node B 210–250 State blocks representing different states according to the preferred embodiment.

DETAILED DESCRIPTION

Let there be a distributed network comprising a group of equivalent systems, called network nodes, connected to a shared common logic communication channel used to transfer information among them. The present invention requires that each network node support point-to-point and broadcast communication capabilities.

Peer-to-peer fault detection consists of a series of routines, programmed on all nodes, which constitute a fault detection mechanism for a pair of nodes sharing the same network.

Consider the simplest case of a network comprising only two nodes. FIG. 1 shows a Node A 110a communicating with a Node B 110b through a shared network 111. Node A 110a sends a broadcast Request message to the network, asking for volunteers to form a pair for reciprocal monitoring. Node B 110b detects the broadcast Request from Node A 110a and sends a broadcast message called Response1 indicating its intention to form a pair with Node A 110a (114). Next, Node A 110a receives the broadcast Response1 from Node B 110b. Node B's address is stored and a point-to-point message called Response2 is sent back to Node B 110b indicating the pair was successfully formed (116). Next, Node B 110b stores Node A's address for future reference and sends back an acknowledge message, called Response_ack, to successfully complete the transaction.

After some time, in the order of seconds, Node B 110b sends a Check message to Node A 110a requesting its updated status (118a). In response to the Check message, Node A 110a replies with a Check message to Node B 110b (120a). Any abnormal status or total absence in a Check message response (i.e., indicative of total fault or absence) is reported by Node B 110b to the user or to another specialized monitoring node, or is stored as a network event for future reports. In the same manner, Node A 110a may request updated status from Node B 110b to check for abnormal conditions (118b, 120b).

This example is a simple illustration of the invention to introduce the basic concept. The final mechanism contemplates a network comprising N nodes, covers all possibilities for broadcast message generation, considers reattempts to send messages, and includes the case of an odd number of nodes, among other features.

Figure 2:
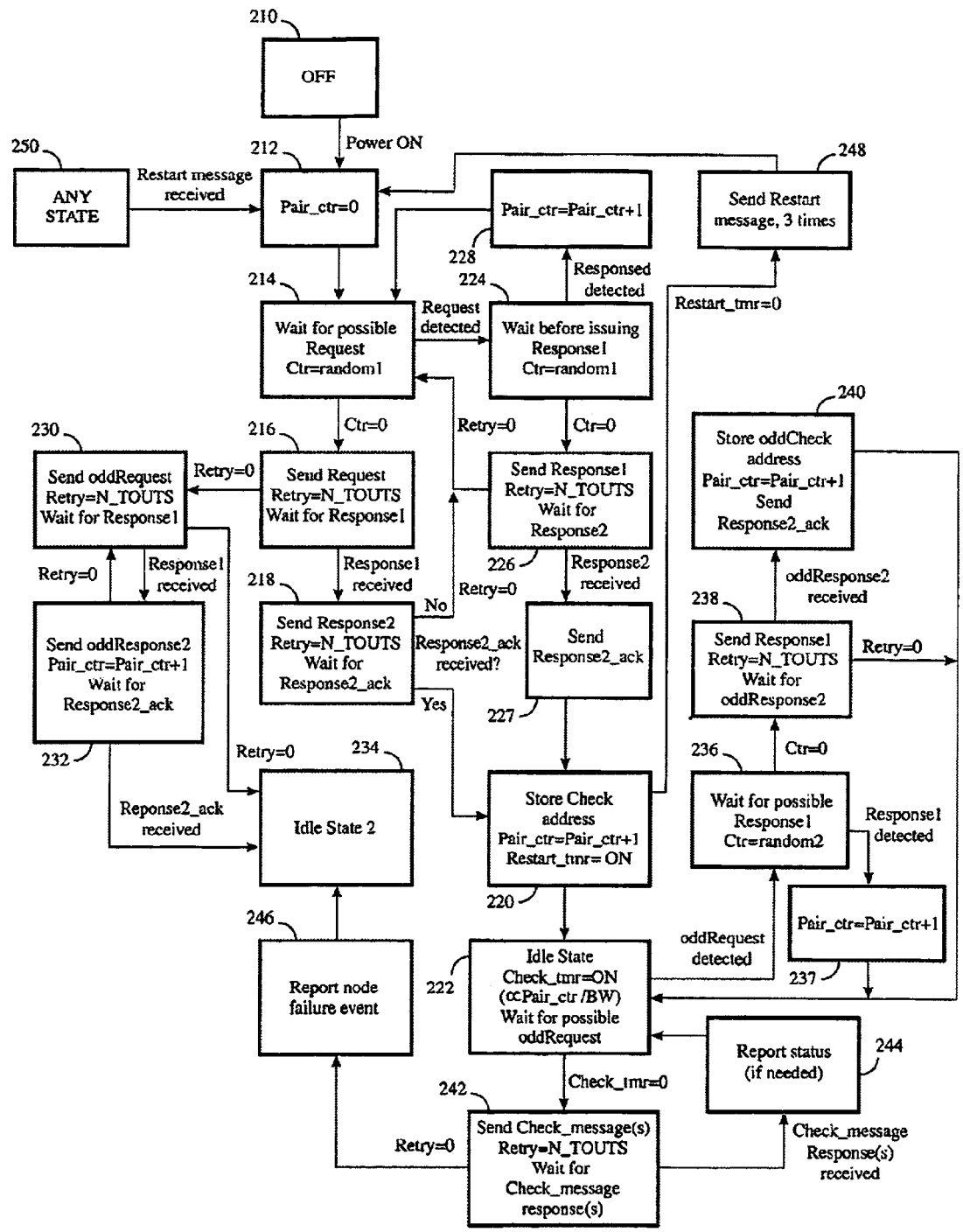
FIG. 2 shows a state diagram according to the preferred embodiment for this invention.

The state diagram shown on FIG. 2 illustrates the mechanism to establish and maintain a fault detection pair for reciprocal monitoring. Each block represents a state and each arrow represents an event that produces a state transition.

The initial state is represented by a network in the OFF state (210). After a Power ON condition, where all nodes are set online, there are no established pairs so a pair counter variable, Pair_ctr, is set to zero (212). The system changes unconditionally to the next state, and each node expects a broadcast Request message generated by any other node. A decreasing counter present in every node (called Ctr) is set to an initial random or pseudo-random number called Random1 (214). Every node waits until its own Ctr reaches zero before continuing to the next state. (This way, collisions caused by several simultaneous broadcasts are avoided.) If a node's Ctr reaches zero, it changes to the next state 216. Since it received no Request messages, it generates and sends out a broadcast Request message and listens for responses. If a Response1 does not arrive within a timeout period, it resends the Request message a number N_TOUTS of times (i.e., a variable called Retry stores the number of retries to be done). In one implementation, the value of N_TOUTS is three, but this value may be configurable. If the expected Response1 is received, the node switches to the next state 218.

In state 218, a Response2 is sent back to the node from which Response1 was received, using the Retry counter to store retries, and the Response2_ack is expected. If this does not arrive (Retry equals 0), state 214 is assumed and the process is restarted. If the Response2_ack is received, the next state 220 is adopted and a Check address is stored in memory. The Check address is retrieved from the source address of the Response1 message, and a fault-detection pair is established. Since a new pair has been formed, the value of Pair_ctr is increased by one. Before leaving this state, a decreasing timer called Restart_tmr is set to ON. The timeout period of this timer, in the order of hours, indicates when to restart the pair assignation process (see below).

Finally, the node switches to state 222, an Idle State, where a decreasing check timer, Check_tmr, is set to ON. When Check_tmr reaches zero, a Check message requesting the status of the associated partner node is sent (state 242) (see below). Check message generation is performed in every network node, resulting in a slight increase of network traffic as the number of nodes increases. However, the availability of greater network bandwidth allows a greater number of messages by time unit. This is why the initial value of the Check_tmr is directly proportional to the number of nodes (taken from the Pair_ctr) and inversely proportional to the available bandwidth. The initial value of Check_tmr must be recalculated each time Check_tmr reaches zero, since the value of Pair_ctr could change while more pairs are established.

The value of Pair_ctr is not an accurate measure of the existing pairs. Since broadcast messaging is not a reliable information transfer method and the mechanism involves transmission retries, the value of Pair_ctr may vary from node to node. However, Pair_ctr helps to produce an estimate number of established pairs (and nodes) to select an adequate Check_tmr in accordance to network size.

Up to here, the described state diagram covers the case of the node that first broadcasts its Request.

Another case arises when a Request from an external node is detected first (i.e., a transition from state 214 to 224). In this case, a network Request is detected and so Ctr is initialized with a new random or pseudo-random value, random2, before sending a Response1 message. Similar to the assignation of random1 (state 214), this prevents collisions from occurring when several nodes try to respond to a Request simultaneously. Detecting a Response1 answer to the original Request (i.e., coming from a different node) means that a new pair is being formed, so the Pair_ctr is increased by one (228) and the process begins again at state 214. The other case, where Ctr reaches zero, indicates that no other node has answered until that moment, so a Response1 message is generated and sent out (226), using the Retry counter explained on state 216. If the Retry counter reaches zero, this means that the node that originally sent the Request message has already established a pair with any other node, and state returns to state 214 to restart the process. In the other case, the Response2 message is received and a Response2_ack is sent back (227). Finally a pair is established by adopting state 220. From this point and on, the flow is the same as the one explained before.

The processes of establishing a pair either by sending a Request or by answering an external Request with a Response1 have been explained.

The third case arises when there is an odd number of nodes. In this situation, there cannot be a normal answer to a Request message. Returning to state 216, Retry counter reaching zero means that no Response1 message was received, and it is assumed that there are no more free nodes to establish a new pair. A special type of request identifying an unpaired node, called oddRequest, is sent, using again the Retry counter (230). As will be explained later, any paired node has the capability to answer an oddRequest, generating a Response1 message. If the Response1 message is received, an oddResponse2 is sent (232) and a Response2_ack message is expected. Similar to the case of oddRequest, oddResponse2 identifies an unpaired node. The Pair_ctr is increased (even when a new pair is not formed, but a trio). If a Response2_ack is not received (Retry equals 0), state 230 is reached again to send a new oddRequest. Otherwise oddResponse2_ack arrives and an Idle State 2 is adopted (234). This is a final or "dead" state. No Check message has to be sent to the partner node since it already has an associated partner responsible for checking it. Checking an already paired node is unnecessary. Returning to state 230, if Retry counter reaches zero, it means there are no other unpaired nodes on the network and the Idle State 2 (234) is adopted.

Another branch of the diagram is represented by the states responsible for answering an oddRequest message. As was said before, a node can answer an oddRequest from an unpaired node if and only if it is already paired. If so, a node must be in Idle State (222) to be able to detect an odd-Request. When an oddRequest is detected in Idle State 222, state 236 is adopted. As in state 224, a Response1 is expected until Ctr (initialized to random or pseudo-random value random2) reaches zero. If a Response1 is detected before Ctr reaches zero, Pair_ctr is increased by one (237) and Idle State 222 is reached again. However, if Ctr reaches zero, a Response1 is sent (238) using the Retry counter, and an oddResponse2 is expected. If it does not arrive (i.e., Retry reaches zero), another node must have answered the odd-Request first, so the Idle State 222 is adopted. In case the oddResponse2 is received, an oddcheck address identifying the odd node is stored, the Pair_ctr is increased by one (240) and the Response2_ack is sent back. After this state, the Idle State 222 is reached unconditionally.

The final branch on the state diagram starts when the Check_tmr reaches zero in Idle State 222. It indicates that a Check message must be sent (242). If there is an associated odd node as well (i.e., case of a trio), then two Check messages are sent. The Retry counter is used and a Check message response is expected. When the Check message response is received, any abnormal status contained in such response is reported to the monitoring station or is stored as a foreign abnormal node status event (244). The original Idle State 222 is readopted. If the Check message response does not arrive (Retry reaches 0), a complete node failure event is reported (246) or stored, and Idle State 2 234 is adopted.

As explained above, any node's Restart_tmr may signal when to restart (i.e., refresh) the pair establishing process. When Restart_tmr reaches zero, a broadcast Restart message is sent three times indicating to every existing node that new pairs must be formed (248). The Pair_ctr is reset (212) and the mechanism restarts. At the same time, independently from the current state (250), reception of a Restart message on a node generates a restart condition, and state 212 is adopted.

CONCLUSION, RAMIFICATIONS AND SCOPE OF INVENTION

Thus, the reader will see that the peer-to-peer fault detection mechanism shown here provides a simple, cost-effective solution in a distributed network.

Using a model of status and fault detection between pair of nodes, complex programming routines are simplified, reducing memory and computation time consumption. These characteristics make such routines suitable for implementation on both high and low processing power systems, from personal computers down to 8-bit microcontrollers, according to the type of networked systems.

Another advantage is that computation time spent when a node checks the status of its associated partner(s) is not affected by the number of interconnected nodes. Evidently, as the number of nodes increases, there will be more check messages, and network traffic may increase slightly. Adjusting the time interval to send a check message according to the number of nodes and available bandwidth may prevent traffic jams associated to fault detect packet generation.

While our above description contains many specificities, these should not be construed as limitations to the scope of the invention, but rather as an exemplification of one preferred embodiment thereof. Obviously, modifications and alterations will occur to others upon a reading and understanding of this specification such as, for example, establishing trios (or any other combination) instead of pairs to perform status and fault checks. From a node's point of view, this is similar to establishing pairs with two other nodes. The system becomes more robust at the expense of an increase in network traffic. Another variation could be the use of multicast messaging instead of broadcast messaging in order to create different zones using the described peer-to-peer mechanism.

The description above is intended, however, to include all such modifications and alterations insofar as they come within the scope of the appended claims or the equivalents thereof.

What is claimed is:

1. A method for peer-to-peer fault detection for distributed, shared media networks, the method comprising the steps of:

Having a distributed network comprising a group of nodes sharing a common communication network supporting point-to-point and broadcast messaging;

Using peer-to-peer logic fault detection in which each node finds a pair to establish a peer-to-peer checking mechanism at network power up;

Reporting any irregular of non-received responses;

Having a node that does not have a node pair send a status report to a paired node; and Having the paired node report any irregular status but not send a reply check message to the node.

2. A network device for peer-to-peer fault detection for distributed, shared media networks comprising:

A distributed network comprising a group of nodes sharing a common communication network sorting point-to-point and broadcast messaging;

A fault detection means using peer-to-peer logic fault detection in which each node finds a pair to establish a peer-to-peer checking mechanism at network power up;

A reporting means reporting any irregular or non-received responses;

Having a node that does not have a node pair send a status report to a paired node; and Having the paired node report any irregular status but not send a reply check message.

* * * * *